United States Patent [19]
Grabaum et al.

[11] Patent Number: 6,085,797
[45] Date of Patent: Jul. 11, 2000

[54] CONSTANT VELOCITY JOINT BOOT AND METHOD OF MAKING THE SAME

[76] Inventors: Gary D. Grabaum, 4835 Pickford Dr., Troy, Mich. 48098; Theodore H. Collins, 568 Pinehurst; Gwynne Williams, 5750 Becker, both of Rochester Hills, Mich. 48309; Mohan L. Sanduja, 144-90 41st Ave., Apt. 508, Flushing, N.Y. 11355; Carl Horowitz, 5607 Fillmore Ave., Brooklyn, N.Y. 11234; Boris Shvartsman, 3165 29th St. #C4, Long Island City, N.Y. 11106; Paul Thottathil, 17 Bryant Ave., New Hyde Park, N.Y. 11040

[21] Appl. No.: 08/717,433

[22] Filed: Sep. 20, 1996

Related U.S. Application Data

[63] Continuation-in-part of application No. 08/271,430, Jul. 7, 1994, abandoned.

[51] Int. Cl.[7] ............................. F16L 11/04; F16L 11/11
[52] U.S. Cl. ........................ 138/121; 138/137; 427/386
[58] Field of Search .................................. 138/121, 137; 427/386

[56] References Cited

U.S. PATENT DOCUMENTS

| | | | |
|---|---|---|---|
| 1,922,431 | 8/1933 | Geyer | 464/175 |
| 4,253,675 | 3/1981 | St. Laurent, Jr. | 277/30 |
| 4,424,834 | 1/1984 | Sumi et al. | 138/121 |
| 4,573,693 | 3/1986 | Nakata et al. | 277/212 FB |
| 4,805,921 | 2/1989 | Ukai et al. | 277/212 FB |
| 4,957,469 | 9/1990 | Zollinger | 464/175 |
| 4,967,609 | 11/1990 | Takagi et al. | 74/18 |

*Primary Examiner*—Erma Cameron
*Attorney, Agent, or Firm*—Brooks & Kushman P.C.

[57] ABSTRACT

Durability of elastomeric bellows-type suspension and drivetrain components, particularly constant velocity joint boots, is improved by coating the elastomeric boot with a thin, flexible, and lubricious coating formed by curing the admixture of epoxy resins, curing agents, an unsaturated polymerizable monomer, a free radical polymerization and/or grafting initiator, and a non-fugitive solid lubricant. The coating strongly adheres to the elastomer and greatly increases the longevity under severe operating conditions.

20 Claims, 2 Drawing Sheets

CONSTANT VELOCITY JOINT BOOT AND METHOD OF MAKING THE SAME

CROSS-REFERENCE TO RELATED APPLICATION

This application is a continuation-in-part of U.S. patent application Ser. No. 08/271,430, filed Jul. 7, 1994, now abandoned, which is incorporated herein by reference.

TECHNICAL FIELD

The present invention pertains to elastomeric constant velocity joint boots. More particularly, the present invention pertains to elastomeric constant velocity joint boots of improved durability prepared by coating an elastomeric boot with an adherent, flexible coating containing one or more solid, non-fugitive lubricants.

BACKGROUND ART

Constant velocity ("CV") joints are common components in automotive vehicles. Typically, an elastomeric boot is employed to cover the CV joint, and thereby protect it from elements encountered during use and service. CV joint boots are generally made of a plastic or polymeric material. The boots are desirably flexible to allow for resilient deformation in response to the dynamics of the underlying CV joint. Commonly encountered materials to make CV joint boots include elastomeric materials such as chloroprene, and polyurethane elastomers. In service, boots made of these materials generally protect the CV joint from dirt, road salt, water, oils, gasoline and the like. The boots are often filled with grease to further these objectives while providing lubrication at the same time.

While these materials generally provide a desirable boot life, a need is perceived to further prolong the boot life by providing a boot that has improved wear characteristics, improved resistance to high temperatures (such as may be encountered in CV joint service), and improved physical properties. There is also a perceived need to prolong the useful service life as well as the shelf life of boots which are not in service, but are warehoused or otherwise stored in anticipation of service, by improving the ability of the boot to resist corrosion and degradation.

SUMMARY OF THE INVENTION

According to the present invention, an improved coated, flexible, elastomeric part of a bellows-type structure is produced which is able to be used advantageously, without limitation, as a constant velocity (CV) joint boot. The resulting article, by comparison with uncoated elastomeric substrates, exhibit improved wear characteristics. The resulting article also exhibits improved physical properties (e.g., impact resistance), and an enhanced ability to withstand corrosive media by comparison with uncoated elastomeric substrates.

BRIEF DESCRIPTION OF THE DRAWINGS

Additional benefits and advantages of the present invention will become apparent to those skilled in the art to which this invention relates from the subsequent detailed description of the preferred embodiments and the appended claims, taken in conjunction with the accompanying drawings:

DETAILED DESCRIPTION OF THE PREFERRED EMBODIMENT

Figure 1:
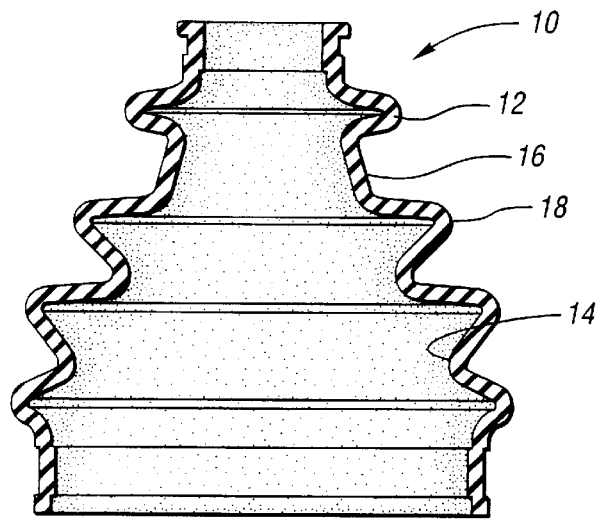
FIG. 1 is a cross-section of a conventional CV joint boot.

Referring to FIG. 1, a conventional CV joint boot 10 is shown. As discussed in further detail herein, the boot 10 is a monolayer article made of a plastic material such as an elastomer, which may be of the thermoset or thermoplastic type.

The boot 10 has a wall 12 having an inner surface 14 and an outer surface 16. The inner and outer surfaces 14 and 16 of the boot 10 are uncoated. The boot 10 has a longitudinal axis and is generally convoluted in an accordion-like manner about the longitudinal axis so that it has a bellows-type configuration including a plurality of circumferential folds 18 spaced apart substantially along the length of its longitudinal axis.

Figure 2:
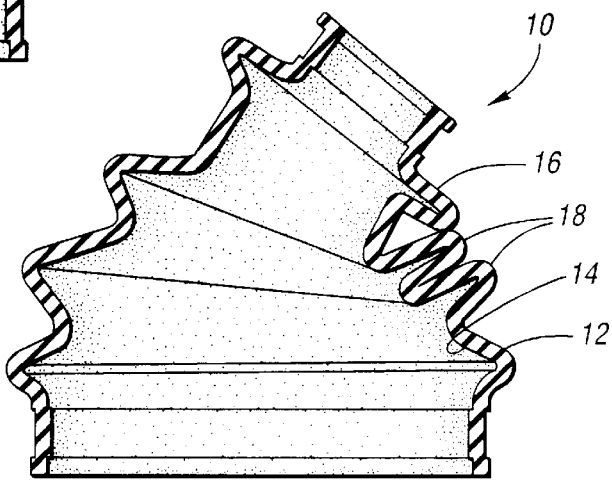
FIG. 2 is a cross-section of a conventional CV joint boot being flexed, as might be encountered during service.

FIG. 2 exemplifies the boot 10 of FIG. 1 in a flexed position as it might be encountered in service (CV joint not shown). As can be seen, two or more folds 18 may come into contact with each other. After prolonged used, wear of the material in the areas near the folds 18 may occur from the contact.

Figure 3:
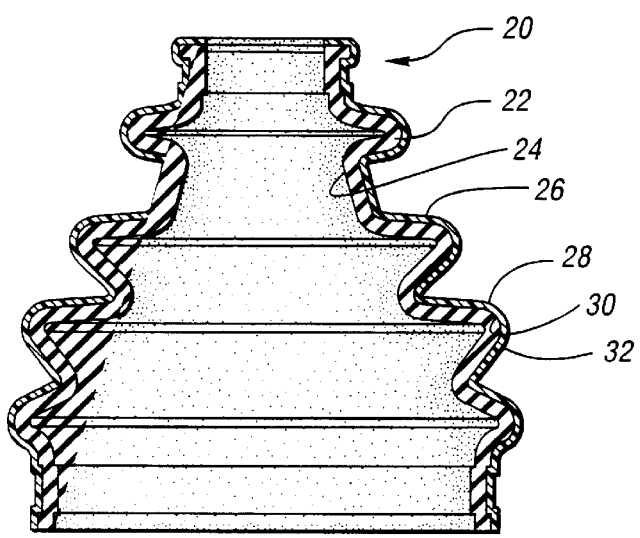
FIG. 3 is a cross-section of a multilayer CV joint boot according to the present invention.

FIG. 3 illustrates a boot 20 according to the teachings of the present invention. The boot has a wall 22 having an inner surface 24 and an outer surface 26. The wall 22 has one or more predetermined thicknesses which varies depending upon the intended use and the boot material. "Predetermined thickness" is defined for purposes of the present invention as the distance between the inner and outer surfaces across a section taken through the wall 22 perpendicular to the surfaces 24 and 26 of the wall. For example, a boot for a CV joint made from a chloroprene-type elastomer may have a wall thickness ranging from about 1.5 to about 3.5 mm, and preferably about 2.5 mm. A coating layer 28 includes an inner surface 30 which preferably lies on at least part of the outer surface 26 of the boot 20. The coating layer also includes an outer surface 32 which is generally exposed. In another embodiment (not shown), a coating layer also lies on at least part of the inner surface 24 of the boot. The coating layer 28 also has one or more predetermined thicknesses (i.e., the distance defined from the outer surface of the coating layer to the outer surface 26 of the boot 20 across a section taken through the wall 22 perpendicular to the outer coating layer), which may vary depending upon a number of things such as the boot material, the properties desired in the coated boot, and the like. An example of a surface thickness for the coating layer ranges from about 35 $\mu$m to about 45 $\mu$m, and more preferably about 37 $\mu$m to about 40 $\mu$m, where $\mu$m denotes micrometers. Under a preferred embodiment, the ratio of the wall thickness to that of the coating layer thickness ranges from about 80:1 to about 40:1, and more preferably is about 60:1.

The method of the present invention includes the steps of:

(1) contacting a surface of a polymeric substrate with a curable admixture including an epoxy resin, a polymerizable ethylenically-unsaturated monomer, an epoxy curing agent, optionally one or more catalyst(s), and one or more graft polymerization initiator(s); and (2) curing the admixture to graft polymerize the admixture with said polymeric substrate.

In a preferred embodiment, the polymeric substrate is a CV joint boot, such as the boot 20 and the admixture is cured to form a coating layer such as coating layer 28.

The polymeric substrate useful in the method of the present invention may be any suitable material capable of being grafted in accordance with the present method. In a preferred embodiment, the substrate is a flexible cross-linkable polymer, preferably an elastomer. More preferably, the elastomer is a chloroprene elastomer such as a neoprene, a thermoplastic polyurethane, or other thermoplastic or thermoset elastomer.

The preferred polymers for use in the present invention have physical properties preferably falling within the ranges of Table 1.

TABLE 1

|  | Neoprene | Hytrel (TPE) |
| --- | --- | --- |
| Specific Gravity at 25° C. | 1.2–1.3 | 1.3—1.3 |
| Hardness | 55–65 Shore A | 40–55 Shore D |
| Tensile Strength, psi | 1450–2400 | 4000–6000 |
| Elongation % | 280–400 | 340–600 |
| Flexural Modulus psi (R.T.) | N/A | 15,000–23,000 |

The polymer also generally has good resistance to most corrosive or degradation-causing chemicals encountered in ordinary service by automobiles (e.g., road salt, water, oils, gasoline, etc.). Preferably, the polymer also is able to withstand temperatures in excess of 100° C. without substantial deterioration or degradation.

The skilled artisan will appreciate that chloroprenes are well known synthetic elastomers available in solid form, such as latex, or as a foam, such as a flexible foam. Preferably, according to the present method, the chloroprene is provided in a solid form. Examples of alternative elastomers that may be used in place of, or in combination with chloroprenes, and particularly with neoprenes include those available under the trade name Santoprene, Pelprene, Arnital and Lomod. Natural rubber substrates may also be employed. Preferably, the rubber or elastomer is a diene-containing material which have one or more active labile hydrogen atoms which can be activated to give rise to a free radical.

An example of a particularly preferred material is commercially available under the trade name HYTREL, supplied by DuPont. Hytrel is believed to be a polyesterurethane-based elastomer used most commonly as a thermoplastic rubber.

In a preferred embodiment, the polymeric substrate is provided in the shape of the ultimate desired article, which still more preferably is a boot for a CV joint such as the type shown as boot 10 in FIGS. 1 and 2 or boot 20 of FIG. 3. The substrate preferably is molded to its desired shape using any suitable method such as blow molding, injection molding or, in the case of thermoset elastomers, reaction injection molding (RIM). The substrate may also be provided in a suitable configuration as an extruded material.

As used herein, "resulting coating layer admixture" refers to the admixture prior to its graft polymerization to the elastomeric substrate.

The coating of the subject invention comprises minimally one or more epoxy resins, one or more curing agents, one or more polymerizable ethylenically unsaturated monomers, a free radical polymerization initiator, and a solid lubricant. Depending upon the reactivity of the curing agent, it may be necessary to add one or more catalysts which effect the cure of the epoxy resin. In a particular embodiment, the formulation contains a minor amount of silver metal and/or a silver compound. Preferred admixtures further contain a silane adhesion promoter and a fluoropolymer. In the claims, the use of "a" implies the use of "one or more" unless the clear grammatical construction implies the contrary.

The amounts of the various necessary and optional ingredients may be varied to achieve the desired results. For example, the nature of the epoxy resin, hardener, polymerizable monomer, free radical initiator, etc., may be varied so as to be compatible with the particular substrate, i.e., CV boot material. For boot material which contains more easily abstracted hydrogen atoms, free radical initiators having low abstracting power may be used, for example. In general, the epoxy resin comprises, based on solids, from about 10% to about 80% by weight of the composition, more preferably from about 20% to about 70%, and more preferably, from about 40% to about 65%. The curing agent comprises from about 3% to about 60%, more preferably from about 3% to about 40%, and most preferably from about 10% to about 30% of the formulation. The polymerizable ethylenically unsaturated monomer comprises about 0.1% to about 10%, more preferably 0.1% to about 5%, and most preferably from about 0.5% to about 3% of the formulation. The solid lubricant is present in an amount of from about 1% to about 40%, preferably 3% to about 30%, and more preferably about 3% to about 10%. The free radical initiator is present in an effective amount to facilitate the polymerization and/or grafting of the ethylenically unsaturated monomers. All percents herein are percents by weight unless otherwise specified, and are based on coating solids unless otherwise indicated. By "solids" is meant those portions of the uncured composition which will be retained in the cured, solid coating. Thus, liquid polymerizable monomers which become part of the cured coating are "solids" as that term is used herein, but solvents which evaporate upon coating or cure of the coating are not.

Epoxy resins which are suitable are available commercially. The epoxy resins which are useful in the paint composition of the invention are aliphatic, cycloaliphatic and aromatic epoxy resins having more than one epoxy group per molecule. Typical epoxy resins include aliphatic epoxy resins such as 1,4-butanediol diglycidyl ether; cycloaliphatic epoxy resins such as 3,4-epoxy-cyclohexylmethyl-3,4-epoxy-cyclohexane carboxylate and bis(3,4-epoxy-6-methyl-cyclohexylmethyl)adipate; diglycidyl ethers of polyphenols; epoxy resins such as bisphenol A and resorcinol diglycidyl ether epoxy resins; phenol-formaldehyde novolac polyglycidyl ether epoxy resins; and similar materials. Such epoxy resins are well known in the art and are described in numerous patents including, for example, U.S. Pat. Nos. 3,776,978 and 3,424,699. Other epoxy resins may be used as well.

Conventional curing and cross-linking agents or hardeners for epoxy resins may be employed for the purpose of cross-linking and hardening the coating composition of the invention. Such hardeners include polyamines, polyamides, polysulfides, urea- and phenol-formaldehyde resins, carboxylic acids or acid anhydrides, alkyl, aryl and alkoxy amines, and preferably polyamines including such materials as ethylenediamine, p-phenylenediamine, tetrakis(2-hydroxyethyl)diethylene-triamine and similar well known materials. The curing agent may also be a urethane resin, preferably an isocyanate-terminated urethane resin, for example an isocyanate-terminated prepolymer prepared by reacting an excess of a di- or polyisocyanate with a hydroxyl-functional polyoxyalkylene polyether or a hydroxyl-functional polyester, or by causing a di- or polyisocyanate to react with itself or with a low molecular weight glycol to form so-called "modified" isocyanates, all of which are commercially available. In addition to reaction with the epoxy resin component, the urethane resin may react with another curing agent, for example an amine curing agent.

The polymerizable unsaturated monomers for use in the method and articles of the present invention are vinyl, preferably acrylic-based monomers, particularly those containing hydroxyl, carboxyl, allyl, or glycidyl functional groups. The monomer may be derived from a salt, ester, amide or corresponding nitrile. Examples of preferred monomers include, without limitation, hydroxyethyl methacrylate, hydroxypropyl methacrylate, dimethylaminoethyl acrylate, dimethylaminoethyl methacrylate, methyl acrylate, ethyl acrylate, butyl acrylate, methyl methacrylate, ethyl methacrylate, butyl methacrylate, glycidyl methacrylate, allyl methacrylate, trimethylolpropane triacrylate, hexanediol diacrylate, and the like. The unsaturated monomers are used by themselves or in combinations of two, three, or more monomers. An example of a commercially available monomer is hydroxyethyl methacrylate, supplied by Rohm & Haas Co. of Philadelphia, Pa.

The composition generally contains both a catalyst and a vinyl polymerization initiator. In many cases, the same compound may perform both functions. Lewis acid catalysts such as boron trifluoride etherate, aluminum chloride, etc., may be used as epoxy curing catalysts, as may also tertiary amines. Free radical initiators frequently catalyze both the vinyl polymerization and grafting reactions necessary to the present invention, but also may catalyze the reaction of the epoxy resin with curing agents. Vinyl polymerization catalysts such as redox catalysts are suitable for use herein, however free radical initiators are preferred. Examples of suitable free radical initiators include benzoyl peroxide, methyl ethyl ketone peroxide, tertiary butyl hydroperoxide, di-tertiary butyl peroxide, tertiary butyl perbenzoate, peracetic acid, or mixtures thereof. Other suitable peroxides are those available under the tradename LUPEROX®, e.g., 2,5-dimethylhexane-2,5-diperoxybenzoate; bis(1-hydroxycyclohexyl)peroxide; and 2,5-dimethylhexane-2,5-peroxybenzoate. Also suitable are a variety of peresters and azo compounds, for example azobis(isobutyronitrile), 1,1'-azobisformamide, azobis(dimethylvaleronitrile), and 4,4'-azobis(4-cyanovaleric acid). An example of a commercially available free radical initiator is benzoyl peroxide.

Preferably, the free radical initiator is employed in an amount ranging from about 0.1 to about 1.0 weight percent of the resulting coating layer admixture, however both larger and smaller amounts are useful as well. The amount should be effective to enable a solid and preferably tack-free coating to be obtained. For any given composition, the required amount of vinyl catalyst and/or free radical initiator may be determined by curing otherwise identical coatings containing varying amounts of catalyst and measuring durability of suitable coatings.

A variety of suitable curing agents are available to accomplish curing, crosslinking, or hardening of the coating layer admixture of the present invention. Examples include materials selected from polyamines, polyamides, polysulfides, polyurethanes, carboxylic acids, acid anhydrides, or mixtures thereof. Preferred curing agents include a material selected from primary-secondary aliphatic amines, hydroxy-aliphatic amines, aromatic amines, or the like. Alternatively, preferred curing agents may include amines or polyamines selected from alkyl, aryl, alkoxy types, or mixtures thereof. Specific examples include ethylenediamine, diethylenetriamine, triethylenetetramine, p-phenylene diamine, tetrakis-(2-hydroxylethyl)diethylenetriamine, or mixtures thereof. An example of a commercially available curing agent is a polyamide available under the trade name Versamid 140 supplied by the Henkel Corporation of Gulph Mills, Pa. A further preferred curing agent is Desmodur N75, an isocyanate-terminated prepolymer available from Bayer, Inc. The curing agent is preferably employed in a ratio of about 0.5 to about 10 parts curing agent to about 1.0 to about 4.0 parts epoxy prepolymer.

An ionic graft-promoting initiator may also be present. In the presence of the substrate of the present invention, the ionic graft-promoting initiator is believed to graft the polymer of the substrate with the coating admixture. In a highly preferred embodiment, the graft-promoting initiator contains a silver ion preferably derived from a silver-containing salt. Examples of preferred silver-containing salts from which to derive such an ion include silver nitrate, silver perchlorate, silver acetate, or mixtures thereof. In some instances, it may be desirable to dissolve the silver-containing salt in an organic solvent. In such instances, the silver-containing salt preferably is soluble in organic solvents (e.g. methyl ethyl ketone). An example of one such salt is silver perchlorate. In the claims, the term "silver" is inclusive of metallic silver, ionic silver, complexed silver, and other forms of the metal. Examples of alternative ion initiators other than silver-containing ones include iron, cobalt, and copper salts. Examples of common, commercially available graft polymerization promoting initiators include silver nitrates and silver perchlorates. Compositions free of silver are contemplated herein. When silver is utilized, the amount of silver salt is very small, e.g. 0.0001 to 1.0% by weight of the uncured coating composition and preferably about 0.05 to 0.10% by weight. Preferably, expressed in parts per million (ppm) of total coating admixture, the silver salt or compound is present in an amount, calculated as silver, of from 5 ppm to 500 ppm, preferably 10 ppm to 100 ppm.

The coating admixtures of the subject invention must contain a solid non-fugitive lubricant. Preferred non-fugitive lubricants are metal compounds possessing natural lubricity, such as tungsten disulfide and molybdenum sulfide, which are highly preferred individually as well as in the form of mixtures. Other lubricious solids may be used as well provided that the lubricant particles adhere to the coating matrix to such a degree that the strength of the coating and its resistance to work-induced cracking is high. Solid lubricants which are suitable candidates include a variety of waxy solids of high melting point such as graphite, polytetrafluoroethylene, polyvinylidene fluoride, and the like. Waxy solids such as paraffin are fugitive, i.e. will disappear over time under the harsh working conditions to which the cured coatings are exposed, and are not suitable for use herein. By the term "non-fugitive" is meant solid lubricants which remain in the solid state at the highest expected normal working temperatures of the CV boots on which the coatings are disposed. By the term "solid" with respect to lubricants is also meant that the lubricant remains solid in the uncured coating admixture, i.e. does not dissolve.

Other additives optionally may be incorporated into the admixture to tailor the desired resulting characteristics. For instance, suitable fillers may be employed in an amount as high as between about 20–30 percent by weight of the resulting coating layer admixture. Examples of suitable fillers include silica, titanium dioxide, aluminum oxide, and mica, among others. Viscosity modifiers may also be employed in suitable amounts. For example, an organic solvent may be employed such as a ketone, e.g., methyl ethyl ketone, methyl isobutyl ketone, or the like; or an aromatic organic solvent, e.g., toluene or the like. Suitable conventional flexibility modifiers, plasticizers, thickeners or thixotropic agents may also be used. Conventional colorants, e.g. carbon black, and reinforcements may likewise be employed.

Preferably, the coatings are free of fillers and reinforcing agents of larger size, i.e. fillers and/or reinforcements, when present, should be in the micron size range. Examples of suitable fillers, for example, are hydrophobic silicas with particle sizes in the range of 0.1 µm to about 10 µm. Larger size particles are feasible but in general should be avoided, as the larger particle sizes may cause an increase in abrasion. Small particles of hydrophobic or hydrophilic silicas may be used to increase coating admixture viscosity. It is preferred that the subject coating admixtures are completely free of fillers.

The resulting coating layer admixture of the present invention preferably is prepared by admixing first and second submixtures. The first submixture preferably contains the epoxy prepolymer, a monomer, a solid lubricant, and other ingredients. Preferably, the components of the first submixture are placed into a suitable container such as a mixing vat and are stirred or milled using a ball roll milling machine. Mixing of the submixture is typically carried out at room temperature for a time ranging from about 24 to about 48 hours, or until a substantially homogeneous mixture is obtained. The skilled artisan, of course, will appreciate that stirring times (as with all stirring steps herein) will vary with such conditions, without limitation, as temperatures, stirring speed and quantities of each of the ingredients. By milling the submixture, preferably the particle size of the solid lubricants and any fillers or other large particulates contained in the formulation will be reduced to plus 7 or less based on the Hegeman scale.

The second submixture preferably includes the curing or cross-linking agent, any catalyst, the free radical initiator and optional materials such as graft polymerization promoter and fillers. These ingredients are placed together in a suitable container such as a mixing vat, in their raw state. They are then stirred under a suitable atmosphere (e.g., ambient air) using a suitable stirring apparatus for a time and at a temperature sufficient to achieve a substantially homogeneous single phase solution. Generally, stirring is carried out at room temperature for a time ranging from about 3 to about 6 minutes, and more preferably from about 4 to 5 minutes.

The ingredients in each submixture are not critical so long as the mixing may be carried out in such a manner so as to avoid premature reaction. For this reason, for example, the free radical initiator is generally included in a different submixture than the polymerizable unsaturated monomer. However, provided mixing times and temperatures are kept suitably low, these ingredients too may be contained in the same mixture. The same is true of the epoxy resin and curing agent. If the curing agent is too reactive, it should be kept in a separate submixture and added to the remaining ingredients just prior to use. However, it is sometimes possible to include the curing agent with the epoxy, particularly when the curing reaction is facilitated by a thermally activated catalyst.

The first and second submixtures are then admixed together. At this stage, the ratio of first to second submixtures may be selected to achieve the desired resulting properties of the material when cured. In a preferred embodiment, the ratio (expressed in parts by weight) of first to second submixtures, namely Part A to Part B, is from about 14:3 for Hytrel and ranges from 3:2 to 12:1 for neoprene on the sample admixture.

As with the individual submixtures, the admixture of the first and second submixtures together is stirred under a suitable atmosphere (e.g., ambient air) using any suitable stirring apparatus for a time and at a temperature sufficient to achieve a substantially homogeneous single phase solution. For example, if stirring is carried out at room temperature, stirring is usually done for a time ranging from about 3 to about 6 minutes, and more preferably 4 to 5 minutes.

The resulting coating layer admixture may be stored or it may be applied immediately to the polymeric substrate. It should be appreciated that the admixture may be prepared in a concentrate form as well. Thus, the quantities of components outlined previously may be higher or lower to accommodate for the concentrate. If used as a concentrate, prior to application to the polymeric substrate preferably the admixture is dissolved in a suitable solvent to achieve the desired resulting concentrations.

In a preferred embodiment, the resulting coating layer admixture is contacted with part or all of the polymeric boot substrate by conventional coating techniques, including but not limited to spraying, brush coating, dipping, sponging, roller coating, or the like. Preferably, the resulting admixture is applied to a thickness sufficient to achieve the desired properties in the resulting coated article.

Once coated with the resulting coating layer admixture, the coated polymeric substrate is heated to accomplish the graft polymerization reaction and curing of the resulting admixture. Heating is done in any suitable environment (e.g., ambient air) in a suitable heating oven (e.g., such as an air circulating oven), and at a suitable pressure (e.g., atmospheric). Preferably, the heating is done at a temperature ranging from about 200° F. which would be preferable for Hytrel and 265° F. which would be preferable for neoprenes. More preferably, heating is done at a temperature ranging from about 220° F. for Hytrel to about 250° F. for neoprene. The time for heating should be selected to accomplish curing throughout the layer of the resulting admixture, and sufficient graft polymerization between the resulting admixture and the polymeric substrate so that a relatively strong bond is accomplished between the polymeric substrate and the cured resulting admixture layer. For example, using the above temperatures in a boot coated with a nominal thickness coating, a time of about 20 to 30 minutes is necessary, and more particularly about 25 minutes is required.

The skilled artisan will appreciate that the times specified for the steps herein may be higher or lower depending upon a number of factors such as the temperature used during each step, the quantity of material involved in the step, and the like.

Without intending to be bound by theory, it is believed that the mechanism of chemical grafting according to the present invention occurs substantially as follows. The elastomer substrate includes a plurality of branch points for receiving monomeric chains otherwise known in polymer chemistry field as a side chain or graft. According to the present invention, grafting generally involves activation of the substrate by suitable means such as and without limitation heat, ultra-violet radiation and most commonly through the use of chain transfer agents. Once the substrate has been activated, chains of monomers linked by carbon-carbon bonds attach to the substrate, thus bonding to the substrate without substantially undermining the existing characteristics of the materials involved. Many materials, both naturally occurring and synthetic, are believed to possess active hydrogens which are typically more reactive under graft polymerization systems than "bulk hydrogens" (e.g., the tertiary hydrogen in polypropylene).

The free radical initiators of the present invention, and when used, the grafting promoters are believed to have the capacity of removing these active hydrogens and concomitantly initiating the growth of polymer chains at the site (i.e. the branch points) from where the active hydrogen was removed. Polymerization according to free radical, anion, or cation mechanisms is advantageously possible according to the present invention, depending on whether hydrogen and one electron, no electrons or two electrons, respectively, are removed by the initiator.

In many instances, a mixture of monomers may be employed and often more than one property can be altered in one processing step. These polymer chains, whose length can be controlled by various techniques such as "grafting from" methods which selectively generate initiation sites for graft chain growth and radical termination, among others, are permanently attached to the substrate. The linkage between the graft-polymer and the substrate is covalent in nature, therefore, it is believed the graft-polymer should not be susceptible to being leached from the substrate.

The mechanisms respecting the grafting process and polymerizations are not well understood and are not essential to an understanding of the manner of making and using the invention. A hypothetical mechanism is presented in U.S. application Ser. No. 08/271,430, assigned to the present assignee, specifically on pages 11–16 which are incorporated herein by reference. In substance, Applicants believe, without wishing to be bound thereto, that the free radical initiator and/or grafting promoter, i.e. silver ion, abstracts a hydrogen atom from the substrate producing a grafting site free radical. This free radical is then believed to initiate polymerization of the polymerizable unsaturated monomers, generating a growing vinyl polymer chain extending from the substrate. This chain may then react with one of the other reactive species in the coating, i.e. the epoxy resin, isocyanate-terminated prepolymer, other curing agent or the like, chemically bonding the polymer coating to the substrate, or may form an interpenetrating polymer network wherein the vinyl polymer becomes physically entangled with the remaining coating polymers, physically interlocking the coating to the substrate. Both modes are likely to be operable at the same time, particularly when vinyl monomers such as those free of non-unsaturated reactive groups such as trimethylolpropane triacrylate are used together with functional monomers such as hydroxyethyl acrylate which has a functional group reactive with both epoxy as well as isocyanate groups.

By whatever mode of operation, the coating becomes affixed to the substrate, the net result is a strong and flexible coating. However, there are many compositions capable of producing adherent and flexible coatings. To produce an improved CV boot, the coating must be more than merely adherent and flexible, but must be capable of resisting abrasion and breakdown associated with the rubbing of adjacent boot folds, as illustrated by FIG. 2 at 18. The subject invention provides the necessary resistance to these conditions where other paints, coatings, etc. do not.

By the term "flexible elastomeric body having a bellows-type structure" is meant an elastomeric part such as a CV joint boot or other component subjected to rotation and/or angular displacement which results in abrasion or other wear of the structure. Generally, such structures are present in automotive or other transportation suspension and/or drive components, powertrain components, or the driving components of stationary equipment driven by diesel engines, gasoline engines, electric motors, and the like.

Having generally described this invention, a further understanding can be obtained by reference to certain specific examples which are provided herein for purposes of illustration only and are not intended to be limiting unless otherwise specified.

HYTREL

EXAMPLE 1

|  | Parts By Weight |
| --- | --- |
| Part A | |
| Epoxy resin (Araldite 488N40) | 100.00 |
| Fluoropolymer polymist F5A | 10.00 |
| Fluoropolymer polyfluo 200 | 5.00 |
| Molybdenum sulfide | 6.00 |
| Tungsten disulfide | 2.00 |
| Methyl ethyl ketone | 50.00 |
| Monomer silane A 187 | 1.00 |
| Trimethylolpropane triacrylate | 1.00 |
| Part B | |
| Urethane prepolymer (Desmodur N-75) | 37.50 |
| Benzoyl peroxide 1.0% solution in MEK* | 0.20 |
| Silver perchlorate 0.1% solution in MEK* | 0.10 |

*methyl ethyl ketone

EXAMPLE 2

|  | Parts By Weight |
| --- | --- |
| Part A | |
| Epoxy resin (Epotuf 38525) | 100.00 |
| Fluoropolymer polymist F5A | 10.00 |
| Fluoropolymer polyfluo 200 | 5.00 |
| Molybdenum sulfide | 5.00 |
| Tungsten disulfide | 3.00 |
| Methyl isobutyl ketone | 50.00 |
| Monomer silane A 1100 | 1.00 |
| Trimethylolpropane triacrylate | 1.00 |
| Part B | |
| Urethane prepolymer (Desmodur N-75) | 37.50 |
| Benzoyl peroxide 1.01% solution in MEK* | 0.20 |
| Silver perchlorate 0.1% solution in MEK* | 0.10 |

*methyl ethyl ketone

EXAMPLE 3

|  | Parts By Weight |
| --- | --- |
| Part A | |
| Epoxy resin DER 684 EK40 | 100.00 |
| Fluoropolymer polymist F5A | 10.00 |
| Fluoropolymer polyfluo 200 | 5.00 |
| Molybdenum sulfide | 4.00 |
| Tungsten disulfide | 4.00 |

-continued

|  | Parts By Weight |
| --- | --- |
| Methyl ethyl ketone | 30.00 |
| Methyl isobutyl ketone | 20.00 |
| Monomer silane A 187 | 1.00 |
| Trimethylolpropane triacrylate | 1.00 |
| Part B | |
| Urethane prepolymer (Desmodur N-75) | 37.50 |
| Benzoyl peroxide 1.0% solution in MEK* | 0.20 |
| Silver perchlorate 0.1% solution in MEK* | 0.10 |

*methyl ethyl ketone

EXAMPLE 4

|  | Parts By Weight |
| --- | --- |
| Part A | |
| Epoxy resin (Araldite R88N40) | 50.00 |
| Fluoropolymer polymist F5A | 8.00 |
| Epoxy resin DER* 684 EK40 | 25.00 |
| Fluoropolymer polyfluo 200 | 3.00 |
| Molybdenum sulfide | 4.00 |
| Tungsten sulfide | 2.00 |
| Methyl ethyl ketone | 40.00 |
| Monomer silane A 174 | 1.00 |
| Trimethylolpropane triacrylate | 1.00 |
| Part B | |
| Urethane prepolymer (Desmodur N-75) | 28.00 |
| Benzoyl peroxide 1.0% solution | 0.15 |
| Silverperchlorate 0–1% solution | 0.10 |

*Dow Epoxy Resin

NEOPRENE

EXAMPLE 5

|  | Parts By Weight |
| --- | --- |
| Part A | |
| Epoxy resin (Araldite 6010) | 13.00 |
| Methyl isobutyl ketone | 14.00 |
| Fluoropolymer aquabead 916 | 2.00 |
| Molybdenum sulfide | 4.00 |
| Tungsten disulfide | 2.00 |
| Fluoropolymer polymist F5A | 2.00 |
| Carbon black | 0.40 |
| Mill the above for 2 days then add: | |
| Polysulfide RLP 2078A | 25.00 |
| Monomer allyl glycidyl ether | 0.50 |
| Monomer allyl methacrylate | 0.50 |
| Trimethylolpropane triacrylate | 0.50 |
| Dow Coming additive DCI 9770 | 0.30 |
| Allylic ureido functional monomer | 0.50 |
| Part B | |
| Versamid 140 | 6.00 |
| Benzoyl peroxide 10% in MEK* | 0.20 |
| Silver perchlorate 0.1% in MEK* | 0.10 |
| Liquid polysulfide RLP 2078B | 4.50 |
| Toluene | 30.00 |

*methyl ethyl ketone

EXAMPLE 6

|  | Parts By Weight |
| --- | --- |
| Part A | |
| Epoxy resin (Epon 828) | 66.00 |
| Methyl isobutyl ketone | 72.00 |
| Fluoropolymer aquabead 916 | 10.00 |
| Molybdenum sulfide | 20.00 |
| Tungsten disulfide | 9.00 |
| Fluoropolymer polymist F5A | 10.00 |
| Tintayd black EP 30-35 | 2.00 |
| Monomer silane A 187 | 2.00 |
| Hycar ATBN 1312-32B2 | 20.00 |
| Part B | |
| Polyamide 830 | 12.00 |
| Polyamide 850 | 6.00 |
| Benzoyl peroxide 10% solution in MEK* | 0.25 |
| Silver perchlorate 0.1% solution in MEK* | 0.10 |

*methyl ethyl ketone

EXAMPLE 7

|  | Parts By Weight |
| --- | --- |
| Part A | |
| Epoxy resin (Aralidte G010) | 13.00 |
| Methyl ethyl ketone | 14.00 |
| Fluoropolymer polyfluo 200 | 2.00 |
| Molybdenum sulfide | 3.50 |
| Tungsten disulfide | 2.50 |
| Fluoropolymer polymist F5A | 2.00 |
| Tintayd EP Black 30-35 | 1.50 |
| Polysulfide LP-3 | 6.00 |
| Monomer silane A 187 | 0.50 |
| Allyl methacrylate | 0.50 |
| Dow Corning additive DCI 9770 | 0.20 |
| Trimethylolpropane triacrylate | 0.50 |
| Part B | |
| Polyamide 830 | 2.50 |
| Polyamide 850 | 2.00 |
| Benzoyl peroxide 10% solution in MEK* | 0.20 |
| Silver perchlorate 0.1% solution | 0.10 |

*methyl ethyl ketone

EXAMPLE 8

|  | Parts By Weight |
| --- | --- |
| Part A | |
| Epoxy resin (Epon 828) | 6.00 |
| Methyl ethyl ketone | 30.00 |
| Fluoropolymer aquabead 916 | 4.00 |
| Molybdenum sulfide | 8.00 |
| Tungsten disulfide | 4.00 |
| Fluoropolymer polymist F5A | 4.50 |
| Tintayd Black 30-35 | 2.00 |
| Polysulfide LP-3 | 12.00 |
| Monomer silane A 187 | 1.00 |
| Allyl methacrylate | 1.00 |
| Trimethylolpropane triacrylate | 0.50 |
| Part B | |
| Polyamide 830 | 6.00 |
| Polyamide 880 | 2.00 |

-continued

| | Parts By Weight |
|---|---|
| Methyl ethyl ketone peroxide | 0.30 |
| Silver perchlorate 0.1% solution in MEK* | 0.15 |

*methyl ethyl ketone

For the above-listed examples, various commercially available trade name products have been utilized. The following is a summary of many of these products.

Araldite G010 is an epoxy resin available from Ciba Geigy, Inc., a division of Ciba Geigy, Ltd., located in Basel, Switzerland.

Polysulfide RLP2078A is a polysulfide available from Thiokol Corp., located in Shreveport, La.

Versamid 140 is an amide curing agent available from Henkel Corp., located in Gulph Mills, Pa.

EPON 828 is an epoxy resin available from Shell Chemical Co., located in Houston, Tex.

Hycar ATBN 1312-32B2 is an amine terminated butadiene resin available from B. F. Goodrich, located in Akron, Ohio.

Polyamide 830 and Polyamide 850 are amide curing agents available from Ciba Geigy, Inc., a division of Ciba Geigy, Ltd., located in Basel, Switzerland.

Polysulfide LP3 is a polysulfide available from Thiokol Corp., of Shreveport, La.

Desmodur N75 is an isocyanate-terminated urethane prepolymer available from Bayer, Inc.

Epotuf 38525 is an epoxy resin available from Reichhold Chemical, Inc., located in Research Triangle Park, N.C.

DER 684 EK40 is an epoxy resin available from Dow Chemical, located in Midland, Mich.

Figure 4:
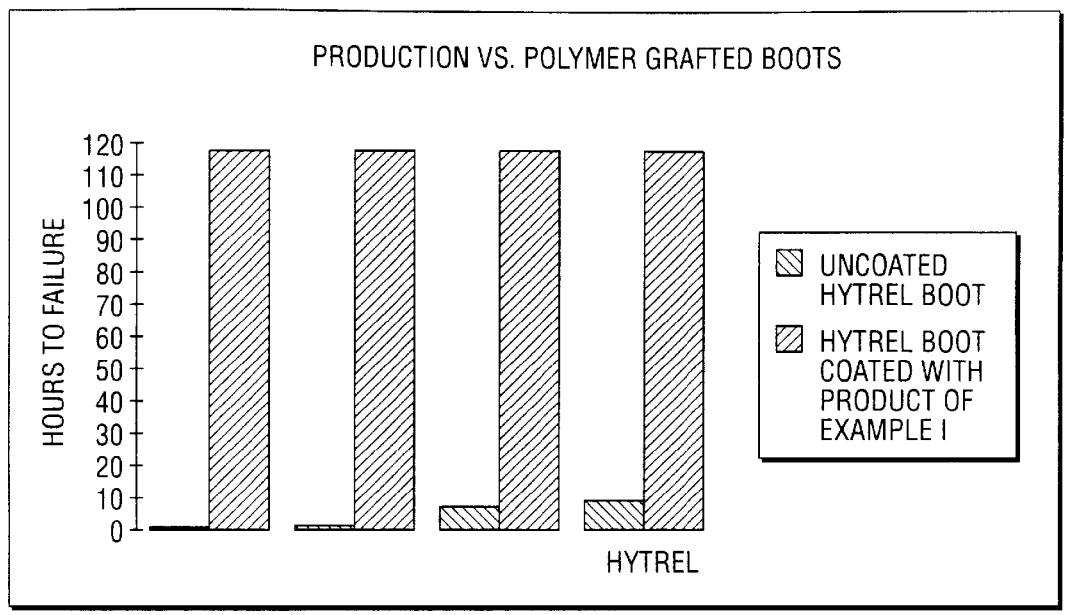
FIG. 4 is a bar graph which illustrates the improvement in durability of Hytrel™ boots coated with a composition in accordance with the subject invention as compared to uncoated boots.
Figure 5:
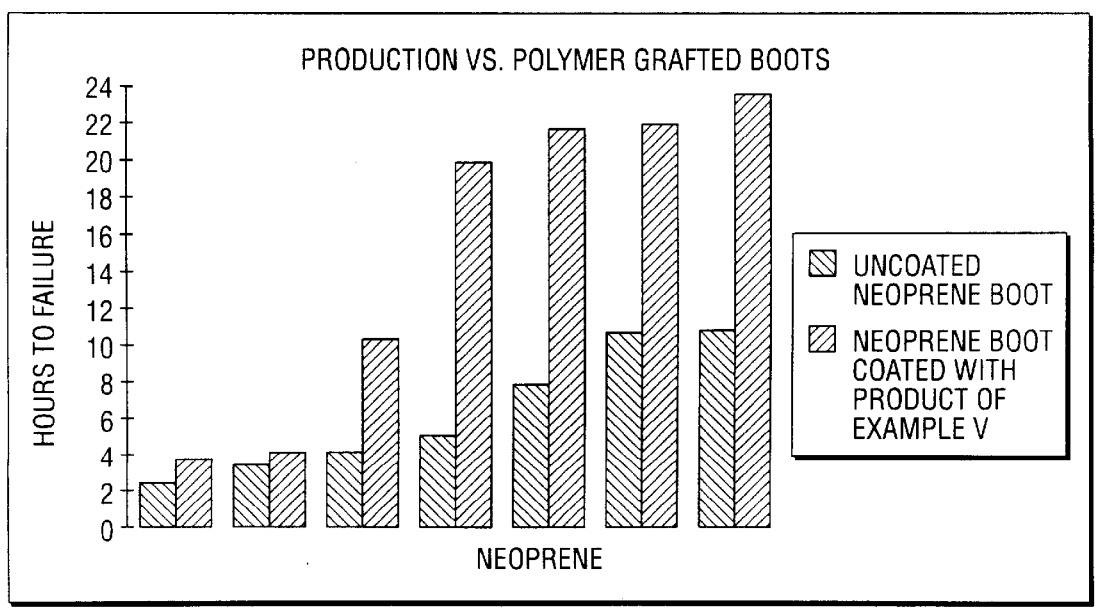
FIG. 5, is a bar graph which illustrates the improvement in durability of neoprene boots coated with a composition in accordance with the subject invention as compared to uncoated boots.

The following Table 2 and FIGS. 4 and 5 summarize the improvement in wear resistance offered by coating the constant velocity joint boot according to the teachings of the present invention. Table 2 sets forth the results of wear tests conducted for multiple runs of coated and uncoated Hytrel and neoprene constant velocity joint boots. For the coated and uncoated Hytrel constant velocity boots, boots were placed on a test rig designed to simulate a constant velocity joint for an automotive vehicle. The simulate joint was suspended at 40° then rotated at 200 rpm's in an atmosphere maintained at 55° C. This testing procedure was continued for both the coated and uncoated Hytrel boot until a hole was detected in each of the boots used for the various runs. The holes which occurred resulted from the convoluted sections rubbing together during rotation of the boot. As seen in Table 2, the uncoated Hytrel boots failed between 0.6 and 9.3 hours. However, the Hytrel boots coated with the product set forth in Example 1 did not fail. The test was discontinued after 118 hours of rotation.

Similarly, the coated and uncoated neoprene constant velocity boots were wear tested. Again, the boots were placed on a test rig suspended at an angle of 40° relative to the supporting substrate. The simulated joint was then rotated at 400 rpms at a room temperature of approximately 68° F. While failure of the uncoated neoprene boots occurred between 2.3 and 10.8 hours, the boots coated with the product set forth in Example 5 failed at time intervals of between 3.6 and 23.9 hours.

As can be seen with reference to Table 2 and the following graphs, the Hytrel boots coated with the product of Example 1 showed an average increase in durability of over two thousand percent as compared to the uncoated Hytrel boot. Further, the neoprene boot coated with the product of Example 5 showed an average increase in durability of over one hundred-eighty percent. "Durability" as that term is used herein refers to the test method described above or an equivalent test used to measure durability under expected and/or extreme operating conditions. By "effective friction-reducing amount" with respect to the lubricant is meant an amount which increases durability as compared to the durability of a boot coated with an otherwise similar coating containing no lubricant.

TABLE 2

| | Uncoated Neoprene | Example 5 Neoprene | Uncoated Hytrel | Example 1 Hytrel |
|---|---|---|---|---|
| Run 1 | 2.3 | 3.6 | 0.6 | 118.1* |
| Run 2 | 3.3 | 4.0 | 2.2 | 118.1* |
| Run 3 | 4.1 | 10.2 | 7.9 | 118.1* |
| Run 4 | 5.0 | 20.0 | 9.3 | 118.1* |
| Run 5 | 7.8 | 21.8 | — | — |
| Run 6 | 10.7 | 22.1 | — | — |
| Run 7 | 10.8 | 23.9 | — | — |
| MIN | 2.3 | 3.6 | 0.6 | 118.1 |
| MAX | 10.8 | 23.9 | 9.3 | 118.1 |
| AVG | 6.3 | 15.1 | 5.0 | 118.1 |

*Test was discontinued after one hundred eighteen hours with no sign of significant wear.

The article of the present invention has been illustrated in connection with a constant velocity joint boot. While such an intended use of the resulting materials of the present invention is preferred, the skilled artisan will appreciate that numerous alternative uses are contemplated as well, including but not limited to applications where it is desired to improve the characteristics of a plastic substrate. Examples include an elastomeric seal including, but not limited to those used on articulated power transmission devices.

Although the invention has been described with particular reference to certain preferred embodiments thereof, variations and modifications can be effected within the spirit and scope of the following claims.

What is claimed is:

1. An improved elastomeric constant velocity joint boot, comprising:
   a) a boot wall of elastomeric material having an inner surface and an outer surface and a wall thickness; and
   b) a cured coating disposed on at least one of said outer surface and/or said inner surface, said coating prior to curing comprising the admixture of:
      b)i) one or more epoxy resins;
      b)ii) one or more polymerizable unsaturated monomers;
      b)iii) one or more curing agents;
      b)iv) an effective amount of one or more vinyl polymerization catalysts; and
      b)v) an effective friction reducing amount of one or more solid non-fugitive lubricants,
   wherein said improved constant velocity joint boot exhibits improved durability with respect to an otherwise identical boot not having said coating disposed thereon.

2. The boot of claim 1 wherein said coating prior to cure comprises the admixture of, in weight percent based on the total weight of the coating composition solids,
   b)i) from about 10% to about 80% of one or more epoxy resins;
   b)ii) from about 0.1% to about 10% of one or more polymerizable unsaturated monomers;

b)iii) from about 3% to about 60% of one or more curing agents;

b)iv) an effective amount of one or more free radical polymerization initiators; and b)v) from about 1% to about 40% of one or more solid non-fugitive lubricants.

3. The boot of claim 1 wherein said coating prior to cure further comprises a grafting promoter.

4. The boot of claim 1 wherein said coating prior to cure further comprises a non-solid fluoropolymer and a silane adhesion promoter.

5. The boot of claim 1 wherein said curing agent is selected from the group consisting of polyamines, polyamides, polysulfides, polyurethanes, carboxylic acids, acid anhydrides, isocyanate-terminated prepolymers, and mixtures thereof.

6. The boot of claim 1 wherein said elastomer comprises a neoprene elastomer or a thermoplastic polyurethane elastomer.

7. The boot of claim 6 wherein said thermoplastic polyurethane elastomer comprises a polyester urethane.

8. The boot of claim 1 wherein said solid, non-fugitive lubricants comprise at least one of a lubricant selected from the group consisting of molybdenum sulfide, tungsten disulfide, and mixtures thereof.

9. The boot of claim 1 wherein said coating prior to cure further comprises one or more volatile solvents.

10. The boot of claim 9 wherein said volatile solvents are selected from the group consisting of the aliphatic ketones.

11. The boot of claim 9 wherein the ratio of the average thickness of said cured coating to said wall thickness is from about 1:40 to 1:80.

12. The boot of claim 1 wherein said coating prior to cure comprises:

b)i) from about 45% to about 75% of one or more epoxy resins;

b)ii) from about 15% to about 35% of one or more isocyanate-terminated urethane prepolymer curing agents;

b)iii) from about 0.1% to about 5% of a diacrylate or triacrylate polymerizable unsaturated monomer;

b)iv) an effective amount of a free radical initiator polymerization catalyst;

b)v) from about 3% to about 15% of one or more solid non-fugitive lubricants, at least one of said lubricants selected from the group consisting of molybdenum sulfide and tungsten disulfide.

13. The boot of claim 12 wherein said coating prior to cure further comprises:

b)vi) from about 0.1 to about 2% of a silane adhesion promoter;

b)vii) from about 4% to about 20% of a non-solid fluoropolymer.

14. The boot of claim 12 wherein said coating prior to cure further contains silver in an amount of from about 5 ppm to about 500 ppm based on the total weight of coating solids.

15. The boot of claim 12 wherein said elastomer comprises a polyesterurethane elastomer.

16. The boot of claim 1 wherein said coating prior to cure comprises:

b)i) from about 10% to about 30% of one or more epoxy resins;

b)ii) from about 1% to about 5% of one or more polymerizable unsaturated monomers;

b)iii) from about 30% to about 60% of one or more polysulfide curing agents and from about 2% to about 10% of a polyamide curing agent;

b)iv) an effective amount of one or more free radical polymerization initiators; and b)v) from about 3% to about 10% of one or more solid, non-fugitive lubricants, at least one of said lubricants selected from the group consisting of molybdenum sulfide and tungsten disulfide.

17. The boot of claim 15 wherein said coating prior to cure further comprises one or more non-solid fluoropolymers in an amount of from about 1% to about 10%.

18. The boot of claim 16 wherein said coating prior to cure further comprises a silver compound in an amount of from about 5 ppm to about 500 ppm based on total coating solids.

19. The boot of claim 16 wherein said elastomer comprises a neoprene elastomer.

20. The boot of claim 1 wherein said coating is free of silver.

* * * * *